(12) United States Patent
Andreas-Schott et al.

(10) Patent No.: US 9,577,284 B2
(45) Date of Patent: Feb. 21, 2017

(54) FUEL CELL STACK ENCLOSURE

(75) Inventors: Benno Andreas-Schott, Triangel (DE); Thomas P. Migliore, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1120 days.

(21) Appl. No.: 12/713,824

(22) Filed: Feb. 26, 2010

(65) Prior Publication Data

US 2011/0212380 A1    Sep. 1, 2011

(51) Int. Cl.
*H01M 8/24*     (2016.01)
*H01M 8/02*     (2016.01)

(52) U.S. Cl.
CPC ......... *H01M 8/2475* (2013.01); *H01M 8/0271* (2013.01); *Y02E 60/50* (2013.01)

(58) Field of Classification Search
CPC ...................... H01M 8/2475; H01M 8/0271
See application file for complete search history.

(56) References Cited

U.S. PATENT DOCUMENTS

| | | | | |
|---|---|---|---|---|
| 5,057,385 A | * | 10/1991 | Hope et al. | 429/162 |
| 5,532,072 A | * | 7/1996 | Spaeh | H01M 8/0625 |
| | | | | 429/423 |
| 5,890,843 A | * | 4/1999 | Bastick et al. | 405/259.1 |
| 6,106,973 A | * | 8/2000 | Sonozaki et al. | 429/162 |
| 6,797,018 B2 | * | 9/2004 | Rouillard et al. | 29/623.2 |
| 7,153,600 B2 | | 12/2006 | Andreas-Schott et al. | |
| 7,204,183 B2 | * | 4/2007 | Cirillo | 86/50 |
| 7,238,441 B2 | | 7/2007 | Andreas-Schott et al. | |
| 7,261,964 B2 | | 8/2007 | Andreas-Schott et al. | |
| 2002/0114990 A1 | * | 8/2002 | Fly et al. | 429/44 |
| 2004/0146777 A1 | * | 7/2004 | Forlino et al. | 429/122 |
| 2005/0208381 A1 | * | 9/2005 | Boulton et al. | 429/234 |
| 2006/0105219 A1 | | 5/2006 | Anderson | |
| 2006/0127734 A1 | | 6/2006 | McLean et al. | |
| 2007/0003806 A1 | | 1/2007 | Sarkar et al. | |
| 2007/0137154 A1 | * | 6/2007 | Agnello et al. | 55/440 |
| 2008/0102345 A1 | | 5/2008 | Andreas-Schott et al. | |
| 2008/0217078 A1 | * | 9/2008 | Kobayashi et al. | 180/65.1 |
| 2008/0241636 A1 | | 10/2008 | Andreas-Schott et al. | |
| 2008/0305380 A1 | | 12/2008 | Andreas-Schott et al. | |
| 2008/0311457 A1 | | 12/2008 | Andreas-Schott et al. | |
| 2009/0130530 A1 | * | 5/2009 | Tanaka | 429/34 |

FOREIGN PATENT DOCUMENTS

| | | |
|---|---|---|
| CN | 1639896 A | 7/2005 |
| CN | 101292387 A | 10/2008 |
| DE | 4324907 A1 | 1/1995 |
| DE | 10151452 A1 | 4/2003 |
| DE | 102005035187 A1 | 3/2006 |
| DE | 60310371 T2 | 10/2007 |

(Continued)

OTHER PUBLICATIONS

Chinese Office Action dated Feb. 1, 2016; Application No. 201110046118.4; Applicant: GM Global Technology Operations LLC.; 14 pages.

(Continued)

*Primary Examiner* — Jeremiah Smith
(74) *Attorney, Agent, or Firm* — BrooksGroup

(57) ABSTRACT

A fuel cell device including a fuel cell stack with a flexible enclosure.

20 Claims, 3 Drawing Sheets

(56) References Cited

FOREIGN PATENT DOCUMENTS

DE     102006060809 A1     6/2008
WO     WO 2007/046490 A1 *  4/2007     ............. H01M 8/24

OTHER PUBLICATIONS

German Office Action dated Feb. 26, 2016 ; Application No. 10 2011 011 653.2 ; Applicant: GM Global Technology Operations LLC ; 5 pages.
Chinese Office Action dated Sep. 15, 2015 ; Application No. 201110046118.4 ; Applicant:GM Global Technology Operations LLC. ; 9 pages.
German Office Action dated Jan. 23, 2015 ; Application No. 102011011653.2 ; Applicant: GM Global Technology Operations LLC; 5 pages.
Chinese Office Action dated May 17, 2013; Applicant: GM Global Technology Operations LLC; Application No. 201110046118.4; 8 pages.
German Office Action dated Apr. 4, 2013; Application No: 102001011653.2; Applicant: GM Global Technology Operations LLC; 6 pages.

* cited by examiner

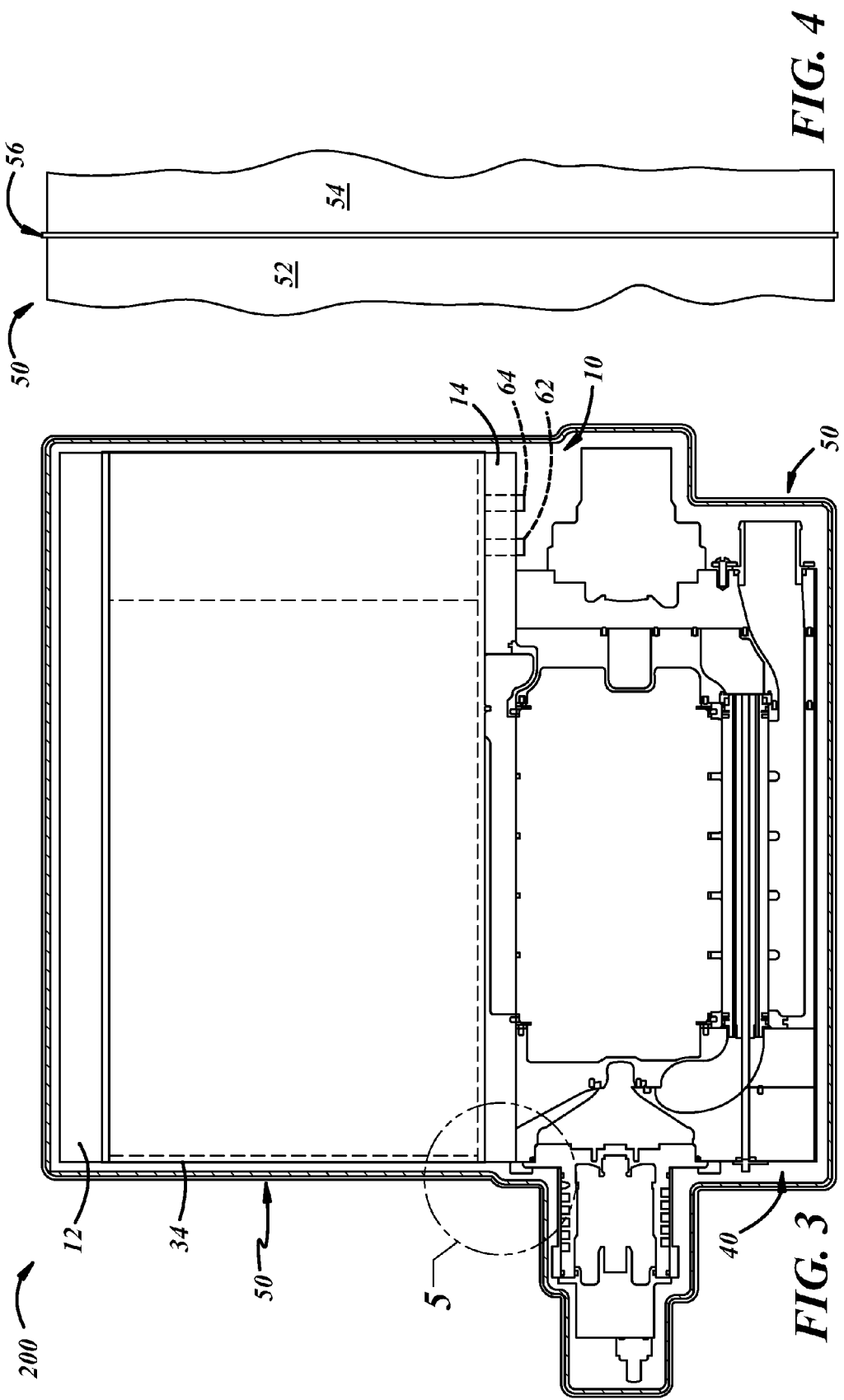

FUEL CELL STACK ENCLOSURE

TECHNICAL FIELD

The field to which the disclosure generally relates includes electrochemical fuel cell stacks and related enclosures.

BACKGROUND

An electrochemical fuel cell system typically includes a stack of individual fuel cells that convert fuel and oxidant reactants into useful electricity and a byproduct of water. The fuel cell stack usually includes a device to compress the fuel cells together to maintain good contact between the cells despite internal reactant pressure that tends to force the cells apart. The fuel cell stack is generally sealingly enclosed between upper and lower end plates and by a steel sleeve surrounding the stack. The sleeve is coupled to the end plates with multiple fasteners, and multiple seals and gaskets disposed between the sleeve and the end plates.

But some stack enclosures may not provide desired insulation against electromagnetic interference (EMI) and/or sealing against environmental conditions. Also, some stack enclosures may require costly and/or heavy components, many fasteners, and several environmental seals and EMI gaskets. Further, some stack enclosures may not compensate for stack expansion and contraction or stack-to-stack build tolerances.

SUMMARY OF EXEMPLARY EMBODIMENTS OF THE INVENTION

One exemplary embodiment includes a fuel cell device including a lower end plate, an upper end plate, a stack of fuel cells disposed between the end plates, and at least one flexible enclosure in sealing contact with the end plates and enclosing the fuel cell stack.

Another exemplary embodiment includes a fuel cell system including an upper end unit including a lower end plate, an upper end plate, and a stack of fuel cells disposed between the end plates. The upper end unit also includes a cell voltage monitoring device disposed between the end plates, and a unitary flexible wrap in sealing contact with the end plates and enclosing the stack and the cell voltage monitoring device. The system further includes a lower end unit disposed beneath the lower end unit, and a multiple piece rigid case enclosing the upper and lower end units.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 3 is a fragmentary sectional side view of an exemplary embodiment of a fuel cell system, including the fuel cell device of FIG. 1 enclosed by a rigid enclosure;

FIG. 4 is a fragmentary end view of the fuel cell system of FIG. 3, illustrating a crimped connection between pieces of the rigid enclosure.

DETAILED DESCRIPTION OF EXEMPLARY EMBODIMENTS

The following description of the embodiment(s) is merely exemplary (illustrative) in nature and is in no way intended to limit the invention, its application, or uses.

In one exemplary embodiment, a fuel cell device may include a stack of fuel cells disposed between upper and lower end plates, and at least one flexible enclosure in sealing contact with the end plates and enclosing the fuel cell stack. In another exemplary embodiment, a fuel cell system may include the aforementioned fuel cell device and a rigid enclosure enclosing the fuel cell device. In general, the flexible enclosure may resist ingress of environmental elements, whereas the rigid enclosure may limit transfer of heat and/or electromagnetic interference therethrough.

Figure 1:
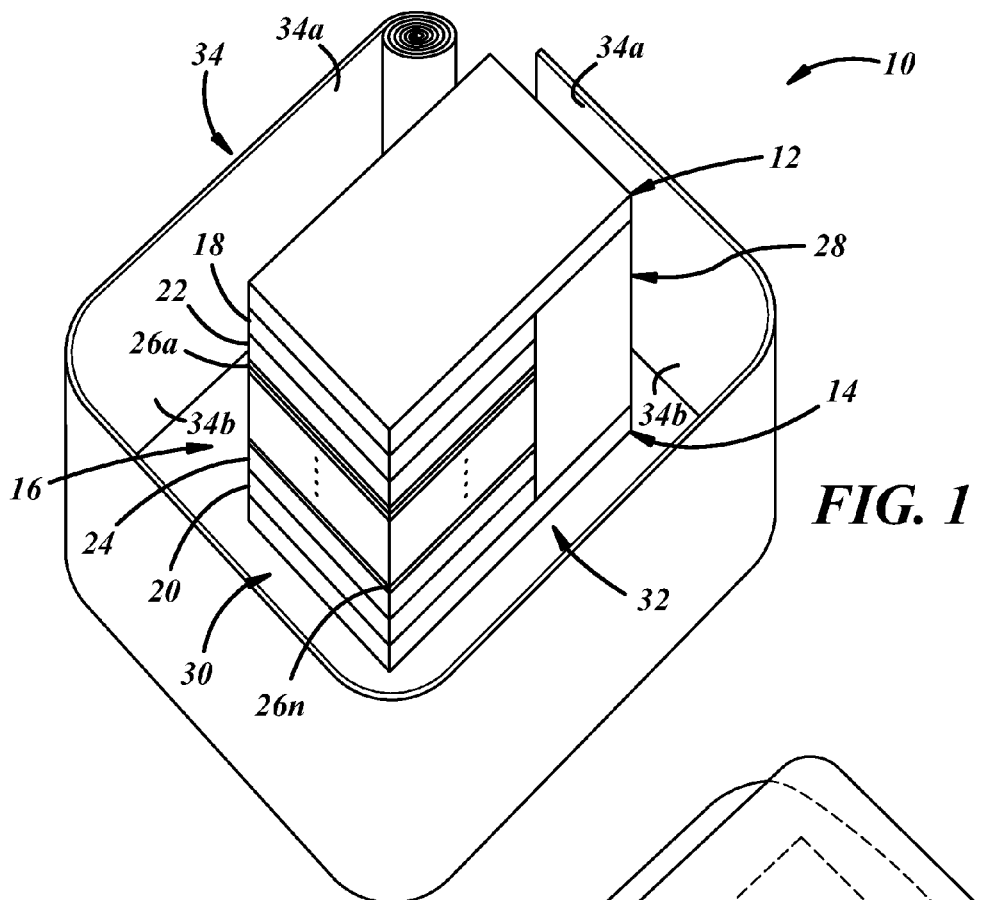
FIG. 1 is a diagrammatic perspective view of an exemplary embodiment of a fuel cell device, including a flexible enclosure being applied to horizontally enclose the device.

According to one embodiment, and referring to FIG. 1, a fuel cell device 10 may include upper and lower end plates 12, 14, and a fuel cell stack 16 disposed between the end plates 12, 14. The fuel cell stack 16 may include upper and lower insulator plates 18, 20 that may be disposed vertically adjacent the end plates 12, 14, and upper and lower current collector plates 22, 24 that may be disposed vertically adjacent the insulator plates 18, 20. Also, the fuel cell stack 16 may include a plurality of individual fuel cells 26a-26n that may be disposed between the current collector plates 22, 24. The fuel cells 26a-26n may be of any suitable type. For example, the fuel cells 26a-26n may be proton exchange membrane types of fuel cells and may include membrane electrode assemblies separated by one or more bipolar plates (not separately shown). Further, the fuel cell device 10 may include a cell voltage monitor (CVM) 28 that may be disposed horizontally adjacent the fuel cell stack 16. The plates 12-24, fuel cells 26a-26n, and CVM 28 may include peripheral sides, for example, along lateral sides 30 (only one shown) and longitudinal sides 32 (only one shown) of the device 10.

Moreover, the fuel cell device 10 may include a flexible enclosure 34 to enclose the end plates 12, 14 and the fuel cell stack 16. The flexible enclosure 34 also may enclose the CVM 28. As shown in FIG. 1, the enclosure 34 may be sheet stock unrolled from a roll if desired. The flexible enclosure 34 may be a non-porous web or sheet of any suitable shape, and may accommodate expansion and contraction of the stack 16. The enclosure 34 may be in contact with the sides of the fuel cells 16 if desired or may be spaced therefrom. As used herein, the term "flexible" may include a component that is flaccid or generally not self-supporting. Also, as used herein, the term "enclose" does not necessarily mean complete encapsulation or surrounding. Rather, enclose is used in its broadest sense and, thus, may include coverage of sides of the stack 16. But the enclosure 34 may also surround the device 10, covering all lateral and longitudinal sides 30, 32. The enclosure 34 remains on the stack 16 during operation of the stack 16.

The flexible enclosure 34 generally may resist ingress of environmental elements into the stack 16 and/or the CVM 28. For example, environmental elements may include dust, dirt, water, and/or the like. However, sealed or unsealed openings may be provided in the enclosure 34 to accommodate ingress and egress of, for example, wires, tabs, conduit, and/or the like.

In a first example, and referring to FIG. 1, the enclosure 34 may include a wrap that may be wrapped horizontally around the stack 16 and CVM 28. The wrap type enclosure 34 may include upper and lower portions 34a, 34b to sealingly attach to corresponding sides of the end plates 12, 14. In general, the wrap may be adhered to the end plates 12, 14 in any suitable manner. For instance, the wrap may be glued to the end plates 12, 14. In another instance, the wrap may include a pressure sensitive adhesive on one side thereof that adheres to the end plates 12, 14, and may also adhere to edges of the fuel cells 26a-26n and to sides of the CVM 28 if desired.

Figure 2:
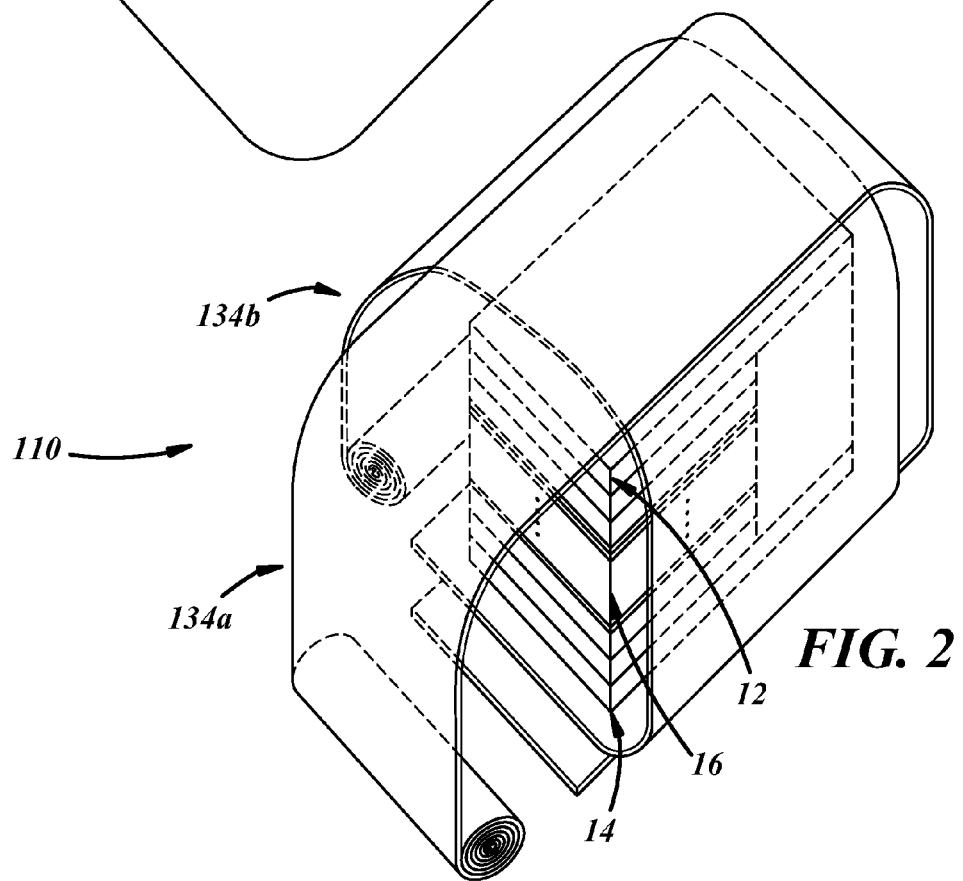
FIG. 2 is a diagrammatic perspective view of another exemplary embodiment of a fuel cell device, including two flexible enclosures being applied to vertically enclose the device.

FIG. 2 illustrates another exemplary embodiment of a fuel cell device 110. This embodiment is similar in many respects to the embodiment of FIG. 1 and like numerals between the embodiments generally designate like or corresponding elements throughout the several views of the drawing figures. Additionally, the descriptions of the embodiments are incorporated by reference into one another and the common subject matter generally may not be repeated here.

Referring to FIG. 2, one or more flexible enclosure(s) 134a, 134b may be wrapped vertically around the end plates 12, 14 and the fuel cell stack 16. For example, the flexible enclosure 134a may include a wrap that may be wrapped in one vertical direction around the device 110 and may be sealingly attached to end surfaces and lateral sides of the end plates 12, 14. In another example, the flexible enclosure 134b may include a wrap that may be wrapped in another vertical direction around the device 110 and may be sealingly attached to end surfaces and longitudinal sides of the end plates 12, 14. In an additional example, both flexible enclosure(s) 134a, 134b may be applied to the device 110, one over the other.

According to another embodiment, instead of wraps, the flexible enclosures 34, 134a, 134b may include one or more circumferentially continuous sleeves (not shown) disposed over the end plates 12, 14 and the fuel cell stack 16, and the CVM 28. For instance, a sleeve may be slipped or stretched vertically over the end plates 12, 14 and the fuel cell stack 16, and the CVM 28, wherein the sleeve extends circumferentially in a horizontal direction consistent with FIG. 1. Upper and lower portions of the sleeve may be attached to corresponding lateral and longitudinal sides of the end plates 12, 14. In another instance, a sleeve may be slipped or stretched horizontally over the end plates 12, 14 and the fuel cell stack 16, and the CVM 28 in a longitudinal direction, wherein the sleeve extends circumferentially in a vertical direction consistent with FIG. 2. In a further instance, a sleeve may be slipped or stretched horizontally over the end plates 12, 14 and the fuel cell stack 16, and the CVM 28 in a lateral direction, wherein the sleeve extends circumferentially in a vertical direction consistent with FIG. 2.

The sleeve(s) may be extruded or formed in any other suitable manner. In general, the sleeve(s) may be adhered to the end plates 12, 14 in any suitable manner. For instance, the sleeve(s) may be glued to the end plates 12, 14. In another instance, the sleeve(s) may include a pressure sensitive adhesive on one side thereof that gets adhered to the end plates 12, 14, and may also be adhered to edges of the fuel cells and to sides of the CVM 28 if desired.

In yet another embodiment, the device 10 may include at least one of the vertically wrapped flexible enclosures 134a, 134b of FIG. 2 and the horizontally wrapped flexible enclosure 34 of FIG. 1. For example, the sheet or sleeve enclosures 134a, 134b of FIG. 2 may be applied to vertically enclose the end plates 12, 14, stack 16, and CVM 28, and then the sheet or sleeve enclosure 34 of FIG. 1 may be horizontally applied over the vertically extending enclosures 134a, 134b. In another example, the sheet or sleeve enclosure 34 of FIG. 1 may be horizontally applied to the end plates 12, 14, stack 16, and CVM 28, and then the sheet or sleeve enclosures 134a, 134b of FIG. 2 may be vertically applied over the horizontally extending enclosure 34.

The enclosure(s) 34, 134a, 134b may be assembled to the rest of the device 10, 110 in any suitable manner. For example, the enclosure(s) 34, 134a, 134b may be applied before the stack 16 is compressed so that there is slack in the enclosure after the stack 16 is compressed. Accordingly, the enclosure(s) 34, 134a, 134b may become taut when the stack 16 is pressurized and may slacken when the stack 16 is depressurized. In another example, the enclosure(s) 34, 134a, 134b may be applied after the stack 16 is compressed so that the enclosure(s) 34, 134a, 134b is in a state of rest that is neither particularly taut nor slack. In both aforementioned examples, the enclosure(s) 34, 134a, 134b may accommodate expansion and contraction. Also, the material of the enclosure(s) 34, 134a, 134b may be chosen such that the enclosure(s) 34, 134a, 134b may stretch when the stack 16 is pressurized and such that the enclosure(s) 34, 134a, 134b may return to its rest state after stack depressurization.

According to another exemplary embodiment, and referring to FIG. 3, a fuel cell system 200 may include an upper end unit in the form of the device 10 of FIG. 1 as shown. Although not shown, the system 200 instead may include an upper end unit in the form of the device 110 of FIG. 2, or may include a combination of both devices 10, 110. The system 200 also may include a lower end unit 40 disposed beneath the device(s) 10, 110. The lower end unit 40 may include any components, devices, or the like for use in a fuel cell system. For example, the lower end unit 40 may include one or more pumps, valves, fans, compressors, humidifiers, reformers, water vapor transfer units, heat exchangers, instrumentation, or the like. The system 200 further may include a rigid enclosure 50 that encloses the device 10 and that also may enclose the lower end unit 40. According to one embodiment, the rigid enclosure 50 may completely surround or encase the device 10. As used herein, the term "rigid" may include generally self-supporting structure.

Figure 5:
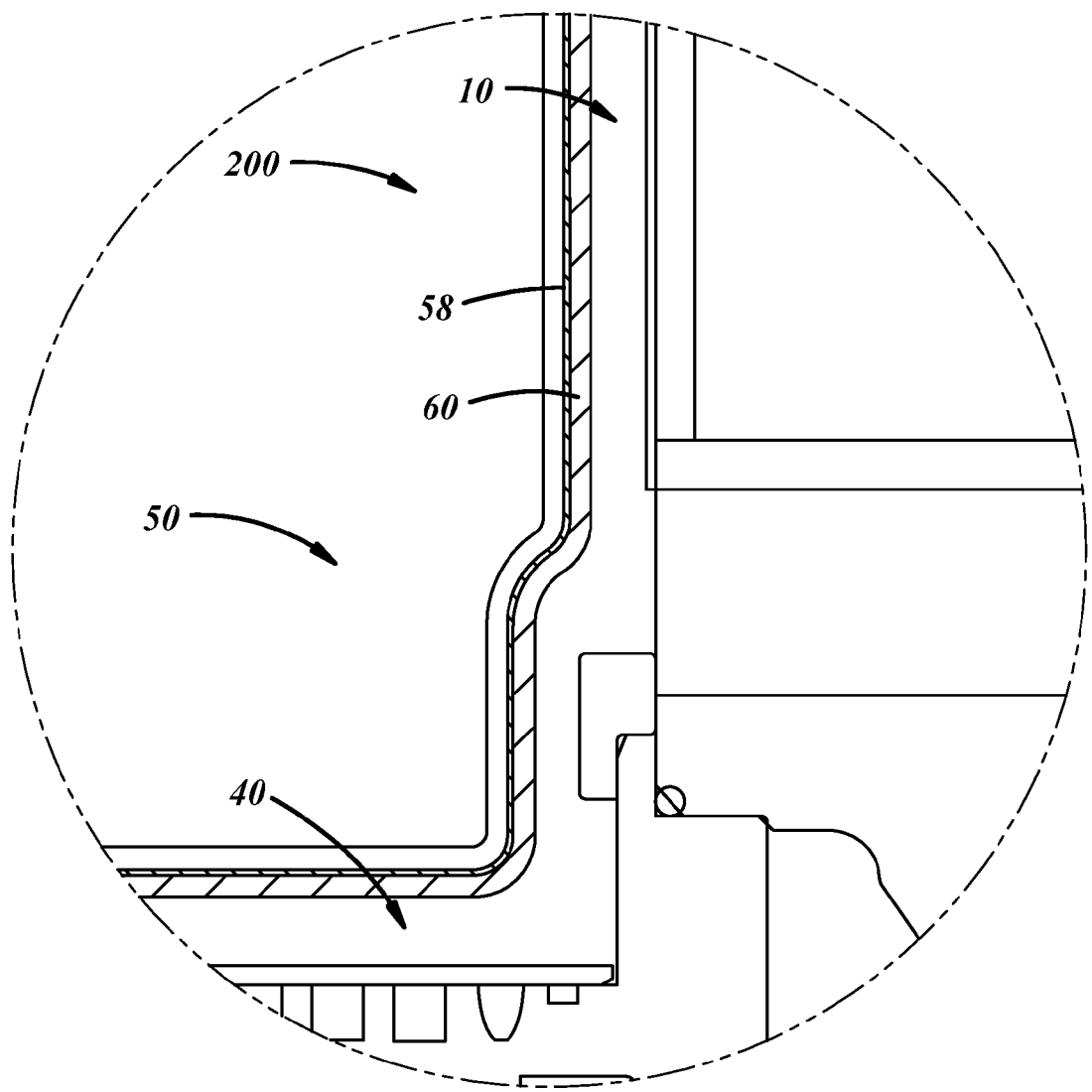
FIG. 5 is an enlarged fragmentary view of circle 5 of FIG. 3.

The rigid enclosure 50 may be spaced from the fuel cell stack and may resist or limit transfer of heat and/or EMI through the enclosure 50, whereas the flexible enclosure 34 resists ingress of environmental elements into the fuel cell stack. The rigid enclosure 50 may be constructed of multiple sections that may be crimped together. For example, as shown in FIG. 5, the rigid enclosure 50 may include first and second sections 52, 54 that may be joined by a crimp 56 that may extend around the enclosure 50. The crimp 56 may extend vertically around the enclosure 50 in one direction as shown in FIGS. 3 and 4, or it may extend vertically around the enclosure 50 in another direction, or it may extend horizontally around the enclosure 50.

Referring to FIG. 5, the rigid enclosure 50 may include any suitable quantity and type(s) of layer(s) and material(s). For example, the enclosure 50 may include a first layer 58 that may include metal foil, and a second layer 60 that may include insulation material. More specifically, the metal foil may be aluminum foil, and the insulation material may be a backing for the foil that may include virgin or recycled fiberglass, plastic, fibrous material, or the like. For instance, an exemplary fibrous material may include a cotton fiber material, which may be chosen for its good thermal insulation and noise and vibration reduction.

Referring to FIG. 3, the fuel cell system 200 may be serviced. For example, any suitable tool may be used to release the crimp 56, and the rigid enclosure sections 52, 54 may be separated to gain access to the rest of the system 200. Once the rigid enclosure 50 is removed, contamination like dust, dirt, water, or other debris, may be washed off of the sealingly enclosed device 10. Accordingly, the device 10 may be decontaminated such that sealed device 10 is suitable to be further disassembled in a clean room environment. The flexible enclosure may be cut and/or peeled away from the rest of the device 10. The rigid and flexible enclosures 34, 50 are not necessarily intended for reuse and, thus, may be disposable components.

Various interfaces may be routed through one or both of the end plates 12, 14. For example, a high voltage power connector or interface 62 and a CVM connector or interface 64 may be located through the lower end plate 14. Traditionally such connections exit a fuel cell stack between stack end plates and extend through thin sheet metal enclosures surrounding the stack. But according to the present disclosure, such break-throughs need not be provided in the enclosure 34, thereby simplifying and improving sealing of the stack 10 and end plates 12, 14 by the enclosure 34.

The above description of embodiments of the invention is merely exemplary in nature and, thus, variations thereof are not to be regarded as a departure from the spirit and scope of the invention.

What is claimed is:

1. A fuel cell device comprising:
   a fuel cell stack comprising:
   a lower end plate;
   an upper end plate;
   a lower insulator plate and an upper insulator plate disposed vertically adjacent to the lower and upper end plates;
   a lower current collector plate and an upper current collector plate disposed vertically adjacent to the lower insulator plate and an upper insulator plate;
   a stack of fuel cells disposed between the current collector plates; and
   at least one flexible enclosure in sealing contact with the end plates and enclosing the fuel cell stack.

2. The fuel cell device of claim 1 wherein the flexible enclosure horizontally circumscribes the end plates and fuel cells.

3. The fuel cell device of claim 1 wherein the flexible enclosure is an enclosure vertically circumscribing the end plates and the fuel cells along one of lateral or longitudinal side edges thereof.

4. The fuel cell device of claim 3 further comprising another enclosure vertically circumscribing the end plates and the fuel cells along the other of the lateral or longitudinal edges thereof, and a further enclosure horizontally circumscribing the end plates and fuel cells over the first and second enclosures.

5. The fuel cell device of claim 1 wherein the flexible enclosure includes a polymeric foil.

6. The fuel cell device of claim 5 wherein the polymeric foil includes a pressure sensitive adhesive on one side thereof to sealingly contact the end plates.

7. The fuel cell device of claim 1 further comprising a cell voltage monitor disposed between the end plates adjacent the fuel cell stack and enclosed by the flexible enclosure.

8. The fuel cell device of claim 1 further comprising an interface extending through at least one of the upper or lower end plates and not extending through the flexible enclosure.

9. A fuel cell system including the fuel cell device of claim 1 and further comprising a rigid enclosure enclosing the fuel cell stack to limit at least one of transfer of heat or transfer of electromagnetic interference therethrough, and whereas the flexible enclosure resists ingress of environmental elements into the stack.

10. The fuel cell system of claim 9 wherein the rigid enclosure includes an outer layer including metal and an inner layer comprising insulating material.

11. The fuel cell system of claim 10 wherein the outer layer is composed aluminum foil, and the inner layer is composed of an insulating fibrous material.

12. The fuel cell system of claim 9 wherein the rigid enclosure includes multiple pieces.

13. The fuel cell system of claim 12 wherein the multiple pieces are crimped together.

14. The fuel cell system of claim 9 further comprising a lower end unit disposed beneath the lower end plate and enclosed by the rigid enclosure.

15. A fuel cell system comprising:
    an upper end unit including:
    a lower end plate;
    an upper end plate;
    a lower insulator plate and an upper insulator plate disposed vertically adjacent to the lower and upper end plates;
    a lower current collector plate and an upper current collector plate disposed vertically adjacent to the lower insulator plate and an upper insulator plate;
    a stack of fuel cells disposed between the current collector plates;
    a cell voltage monitoring device disposed between the end plates; and
    a unitary flexible wrap in sealing contact with the end plates and enclosing the stack and the cell voltage monitoring device to resist ingress of environmental elements into the stack an cell voltage monitoring device;
    a lower end unit disposed beneath the upper end unit; and
    a multiple piece rigid case spaced from the stack and crimped together to enclose the upper and lower end units to limit at least one of transfer of heat or transfer of electromagnetic interference therethrough.

16. The fuel cell system of claim 15 wherein the flexible wrap includes a polymeric foil including a pressure sensitive adhesive on one side thereof.

17. The fuel cell system of claim 15 wherein the rigid case includes an outer layer including metal and an inner layer comprising insulating material.

18. The fuel cell system of claim 17 wherein the outer layer is composed aluminum foil, and the inner layer is composed of an insulating fibrous material.

19. The fuel cell system of claim 15 further comprising an interface extending through at least one of the upper or lower end plates and not extending through the flexible wrap.

20. A fuel cell device comprising:
    a fuel cell stack comprising:
    a first end plate;
    a second end plate;
    a stack of fuel cells disposed between the first end plate and second end plate plates;
    a cell voltage monitoring device disposed between the end plates;

at least one flexible enclosure in sealing contact with the end plates and enclosing the fuel cell stack; and a rigid enclosure spaced from the stack of fuel cells, the rigid enclosure comprising a first layer comprising a metal foil, and a second layer comprising an insulating material.

* * * * *